(12) United States Patent  
Bae et al.

(10) Patent No.: US 8,908,975 B2  
(45) Date of Patent: Dec. 9, 2014

(54) APPARATUS AND METHOD FOR AUTOMATICALLY RECOGNIZING A QR CODE

(71) Applicant: Yewon Communication Co., Ltd., Seoul (KR)

(72) Inventors: So Woon Bae, Incheon (KR); Byoung Sun Kim, Namyangju-si (KR); Sung Ho Yang, Seoul (KR)

( * ) Notice: Subject to any disclaimer, the term of this patent is extended or adjusted under 35 U.S.C. 154(b) by 0 days.

(21) Appl. No.: 14/351,142

(22) PCT Filed: Oct. 9, 2012

(86) PCT No.: PCT/KR2012/008142  
§ 371 (c)(1),  
(2), (4) Date: Apr. 10, 2014

(87) PCT Pub. No.: WO2013/055069  
PCT Pub. Date: Apr. 18, 2013

(65) Prior Publication Data  
US 2014/0314320 A1  Oct. 23, 2014

(30) Foreign Application Priority Data

Oct. 10, 2011  (KR) .......................... 10-2011-0102832

(51) Int. Cl.  
*G06K 9/46* (2006.01)  
*G06K 9/62* (2006.01)

(52) U.S. Cl.  
CPC ...................................... *G06K 9/623* (2013.01)  
USPC ........... 382/190; 382/254; 382/233; 382/209; 382/103; 382/132; 382/243

(58) Field of Classification Search  
CPC .............. G06K 7/1443; G06K 7/1417; H04N 1/00363; H04N 2201/3269

USPC .......... 382/190, 254, 233, 209, 103, 132, 243  
See application file for complete search history.

(56) References Cited

U.S. PATENT DOCUMENTS

2005/0121520 A1* 6/2005 Yamaguchi et al. ..... 235/462.09  
2011/0290882 A1* 12/2011 Gu et al. ................... 235/462.11  
2013/0136361 A1* 5/2013 Cheong et al. ................ 382/190

FOREIGN PATENT DOCUMENTS

| KR | 10-2001-0113578 A | 12/2001 |
| KR | 10-0852656 B1 | 8/2008 |
| KR | 10-0860994 B1 | 9/2008 |
| KR | 10-0920663 B1 | 10/2009 |
| KR | 10-2010-0085887 A | 7/2010 |

* cited by examiner

*Primary Examiner* — Mike Rahmjoo  
(74) *Attorney, Agent, or Firm* — Rabin & Berdo, P.C.

(57) ABSTRACT

An apparatus and method for automatically recognizing a QR code without a need to control the distance for recognition in relation to one QR code or two or more QR codes. The apparatus includes a photographing unit obtaining a surrounding image the QR code including recognition points and surroundings, a QR code recognition unit converting the surrounding image into a grayscale image of a pixel unit, converting the grayscale image into a histogram indicative of a distribution map according to the luminosity of each pixel, extracting only pixels having a luminosity value concentration level corresponding to a threshold or higher based on the histogram, setting the extracted pixels as a candidate pixel group, searching the set candidate pixel group for recognition points through a recognition marker, when the recognition points are conceived, recognizing a region in which the conceived recognition points are placed as a QR code.

15 Claims, 5 Drawing Sheets

APPARATUS AND METHOD FOR AUTOMATICALLY RECOGNIZING A QR CODE

TECHNICAL FIELD

The present invention relates to an apparatus and method for automatically recognizing a QR code, which can recognize a QR code by automatically photographing the QR code without a need to adjust the distance for identifying one QR code or two or more QR codes when a user executes a QR code recognizing application installed in a smart phone carried by the user.

BACKGROUND ART

In general, a QR code is a two-dimensional code of a matrix form that indicates information in black and white lattice patterns. The QR code is mostly used in Japan, and the name QR code was derived from a registered trademark Quick Response of Denso Wave. In particular, the QR code is two-dimensional barcode that has overcome a limited capacity of barcode that had been conventionally used a lot and has a format and contents extended from the conventional barcode. The QR code includes perpendicular and horizontal information, text data in addition to numbers can be stored in the QR code, and the QR code is utilized by reading the QR code using a digital camera or a dedicated scanner.

In other words, number information can be stored in common barcode in a one-direction. In contrast, the QR code can include more information because it has a two-dimensional form perpendicularly and horizontally, and text data, such as the alphabet and the Chinese characters, in addition to numbers can be stored in the QR code. Color may be stored in the QR code if the light and shade of the color can be determined. This QR code can include a maximum of 1817 Asian letters, such as a maximum of 7089 numbers, a maximum of 4296 ASCII letters, and a maximum number of 2953 in binary 8 bits. In particular, the QR code is advantageous in that it has a high recognition ratio and very fast processing speed.

However, there is inconvenience in that if a conventional QR code is sought to be recognized by a scanner at a distance of about 1 meter or 2 meters, a user has to bring the scanner close to the QR code and controls the QR code displayed on a screen of the scanner so that the QR code is matched with a recognition frame on the screen.

Furthermore, there was inconvenience in that if a plurality of two or more QR codes was sought to be scanned, a user had to perform processes of controlling the two or more QR codes according to a recognition frame, such as that described above, one by one individually using a scanner and pieces of information about the scanned QR codes had to be managed using a process of separately checking and storing the QR codes through such a process.

DETAILED DESCRIPTION OF THE INVENTION

Technical Problems

An object of the present invention for solving the aforementioned problems is to provide an apparatus and method for automatically recognizing a QR code, which can recognize a QR code by automatically photographing the QR code without a need to control the distance for recognition in relation to one QR code or two or more QR codes when a QR code recognition application installed in a smart phone that is carried by a user is executed.

Means for Solving the Problems

An apparatus for automatically recognizing a QR code for achieving the aforementioned object in accordance with an embodiment of the present invention includes a photographing unit obtaining a surrounding image including a QR code by photographing the QR code including recognition points and surroundings; a QR code recognition unit converting the surrounding image including the QR code obtained by the photographing unit into a grayscale image of a pixel unit, converting the grayscale image into a histogram indicative of a distribution map according to the luminosity of each pixel, extracting only pixels having a luminosity value concentration level corresponding to a threshold or higher based on the histogram, setting the extracted pixels as a candidate pixel group, searching the set candidate pixel group for recognition points through a recognition marker, recognizing the retrieved recognition points as a QR code if the recognition points are recognized, and reading out the information stored in the recognized QR code; a display unit displaying an image of the recognized QR code or displaying the read-out information in the QR code; and a memory unit matching the image of the recognized QR code with the read-out information in the QR code and storing the matched image and the read-out information.

Furthermore, if three recognition points are not recognized in the candidate pixel group through the recognition marker and thus a QR code is not recognized, the QR code recognition unit may enlarge the surrounding image including the QR code obtained through the photographing unit in a vector way, correct the enlarged surrounding image, converts the enlarged and corrected surrounding image including the QR code into a grayscale image of a pixel unit, convert the grayscale image into a histogram indicative of a distribution map according to the luminosity of each pixel, extract only pixels each having a luminosity value concentration level corresponding to a threshold or higher based on the histogram, set the extracted pixels as a candidate pixel group, search the set candidate pixel group for recognition points through the recognition marker, and recognize retrieved three recognition points as a QR code if the three recognition points are recognized.

Furthermore, the apparatus may further include a communication unit for externally sending an image of the recognized QR code and the read-out information of the QR code and a control unit for controlling the image of the recognized QR code and the read-out information of the QR code so that the image and the read-out information are displayed or stored, sending the image of the recognized QR code and the read-out information of the QR code through the communication unit, and controlling the image of the recognized QR code and the read-out information of the QR code so that the image and the read-out information are registered with external social network service.

Furthermore, if two or more QR codes are photographed through the photographing unit, the QR code recognition unit may convert a surrounding image including a QR code, first obtained by the photographing unit, into a grayscale image of a pixel unit, convert the grayscale image into a histogram indicative of a distribution map according to the luminosity of each pixel, extract only pixels each having a luminosity value concentration level corresponding to a threshold or higher based on the histogram, set the extracted pixels as a candidate pixel group, search the set candidate pixel group for three recognition points through a recognition marker, recognize the retrieved three recognition points as a QR code when the three recognition points are recognized, and read out the information stored in the recognized QR code, convert a surrounding image including a QR code, second obtained by the photographing unit, into a grayscale image of a pixel unit, convert the grayscale image into a histogram indicative of a distribution map according to the luminosity of each pixel, extract only pixels each having a luminosity value concentration level corresponding to a threshold or higher based on the histogram, set the extracted pixels as a candidate pixel group, search the set candidate pixel group for three recognition points through a recognition marker, recognize the retrieved three recognition points as a QR code when the three recognition points are recognized, and read out the information stored in the recognized QR code, and convert a surrounding image including a QR code, finally obtained by the photographing unit, into a grayscale image of a pixel unit, convert the grayscale image into a histogram indicative of a distribution map according to the luminosity of each pixel, extract only pixels each having a luminosity value concentration level corresponding to a threshold or higher based on the histogram, set the extracted pixels as a candidate pixel group, search the set candidate pixel group for three recognition points through a recognition marker, recognize the retrieved three recognition points as a QR code when the three recognition points are recognized, reading out the information in the recognized QR code, and display pieces of the read-out information of the QR codes on a screen in a list form.

Furthermore, the apparatus may further include a luminous intensity detection unit for detecting luminous intensity in a periphery of the QR code and a flash unit for lighting a flash in response to the detected luminous intensity of the luminous intensity detection unit, wherein if surrounding luminosity is dark based on the surrounding luminous intensity detected by the luminous intensity detection unit, the flash unit lights the flash and the QR code recognition unit corrects a backlight of an image of the QR code captured by the photographing unit.

Meanwhile, in an application providing apparatus for a user terminal for providing a program for a user terminal over a communication network for achieving the above object in accordance with an embodiment of the present invention, the program obtains a surrounding image including a QR code by photographing the QR code including recognition points and surroundings through a camera, converts the obtained surrounding image including the QR code into a grayscale image of a pixel unit, converts the grayscale image into a histogram indicative of a distribution map according to the luminosity of each pixel, extracts only pixels each having a luminosity value concentration level corresponding to a threshold or higher based on the histogram, sets the extracted pixels as a candidate pixel group, searches the set candidate pixel group for recognition points through the recognition marker, recognizes recognized three recognition points as a QR code when the three recognition points are recognized, enlarges the surrounding image including the QR code obtained through the camera in a vector way if three recognition points are not recognized in the candidate pixel group through the recognition marker and thus a QR code is not recognized, corrects the enlarged surrounding image, converts the enlarged and corrected surrounding image including the QR code into a grayscale image of a pixel unit, converts the grayscale image into a histogram indicative of a distribution map according to the luminosity of each pixel, extracts only pixels each having a luminosity value concentration level corresponding to a threshold or higher based on the histogram, sets the extracted pixels as a candidate pixel group, searches the set candidate pixel group for three recognition points through the recognition marker, recognizes the retrieved three recognition points as a QR code, and reads out the information in the recognized QR code.

Meanwhile, a method for automatically recognizing a QR code for achieving the above object in accordance with an embodiment of the present invention includes steps of (a) obtaining a surrounding image including a QR code by photographing a QR code including recognition points and surroundings through a photographing unit; (b) converting the surrounding image including the QR code, obtained through the photographing unit, into a grayscale image of a pixel unit; (c) converting the grayscale image into a histogram indicative of a distribution map according to the luminosity of each pixel; (d) extracting only pixels each having a luminosity value concentration level corresponding to a threshold or higher based on the histogram and setting the extracted pixels as a candidate pixel group; (e) searching the set candidate pixel group for recognition points through a recognition marker; (f) recognizing retrieved three recognition points as a QR code when the retrieved three recognition points are recognized; and (g) reading out the information stored in the recognized QR code.

Furthermore, if three recognition points are not recognized in the candidate pixel group through the recognition marker and thus a QR code is not recognized at the step (f), the surrounding image including the QR code obtained through the photographing unit may be enlarged, the enlarged surrounding image may be corrected, and the steps (b) to (g) may be performed on the enlarged and corrected surrounding image including the QR code.

Furthermore, the method may further include a step (h) of externally sending an image of the recognized QR code and the read-out information in the QR code, sending the image and the read-out information to social network service, and registering the image and the read-out information with the social network service.

Furthermore, if two or more QR codes are photographed at the step (a), the steps (b) to (g) may be performed on a surrounding image including a QR code that is first obtained through the photographing unit, the steps (b) to (g) may be performed on a surrounding image including a QR code that is second obtained through the photographing unit, and the steps (b) to (g) may be performed on a surrounding image including a QR code that is finally obtained in the same process through the photographing unit.

Accordingly, the method may further include steps of (h) displaying pieces of the read-out information in the QR codes on a screen in a list form; (i) selecting one QR code from the list of pieces of information in the QR codes; and (j) providing the read-out information for the information in the QR code corresponding to the selected list.

Furthermore, the step (a) may include lighting a flash if luminous intensity in a periphery of the QR code is detected and surrounding luminosity is dark, obtaining a surrounding image including the QR code by photographing the QR code and surroundings, and correcting a backlight of the obtained surrounding image including the QR code.

Meanwhile, a program for executing a method for automatically recognizing a QR code in accordance with an embodiment of the present invention may be recorded on a computer-readable medium.

Effect of the Invention

In accordance with the present invention, a QR code can be automatically recognized without a need for a user to control a specific distance as in the prior art so that the QR code is photographed or recognized or to control the size of a photographed QR code according to a recognition frame on a screen.

Furthermore, a plurality of QR codes can be automatically recognized through one photographing without a need to individually photograph the plurality of QR code and information about each of the QR codes can be read and provided.

Accordingly, the time taken to photograph and recognize a QR code can be significantly reduced, and information stored in a QR code can be checked within a short time.

EMBODIMENTS OF THE INVENTION

The details of the object and technical composition of the present invention and operational effects thereof will be more clearly understood from the following detailed description based on the accompanying drawings attached to the specification of the present invention. Hereinafter, embodiments of the present invention are described in detail with reference to the accompanying drawings.

Figure 1:
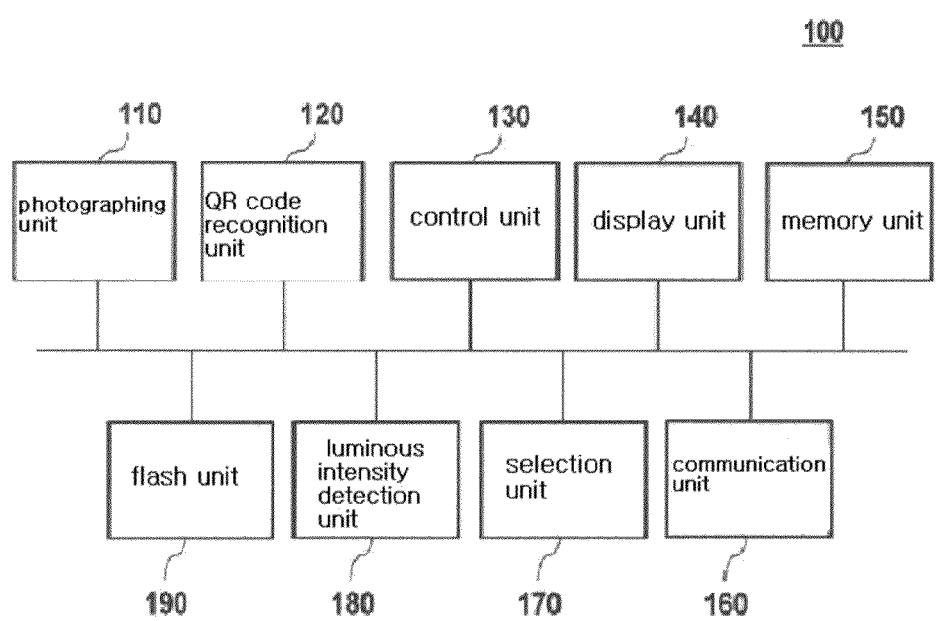
FIG. 1 is a diagram schematically showing the general composition of a QR code automatic-recognition apparatus in accordance with an embodiment of the present invention.

FIG. 1 is a diagram schematically showing the functional composition of a QR code automatic-recognition apparatus in accordance with an embodiment of the present invention.

Referring to FIG. 1, the QR code automatic-recognition apparatus 100 in accordance with an embodiment of the present invention includes a photographing unit 110, a QR code recognition unit 120, a control unit 130, a display unit 140, a memory unit 150, a communication unit 160, a selection unit 170, a luminous intensity detection unit 180, and a flash unit 190.

Here, the QR code automatic-recognition apparatus 100 may be applied to a smart phone, carried by a user, as a QR code recognition application, a computer device connected to the Internet, and an additional dedicated QR code recognition apparatus.

The photographing unit 110 includes a camera and obtains a surrounding image including a QR code as shown in FIG. 3(A) by photographing the QR code that is spaced apart from the camera at an interval, for example, 30 cm, 50 cm, or 1 m.

The QR code recognition unit 120 converts a surrounding image including a QR code, obtained by the photographing unit, into a grayscale image of a pixel unit, converts the grayscale image into a histogram indicative of a distribution map according to the luminosity of each pixel, extracts only pixels each having a luminosity value concentration level corresponding to a threshold or higher based on the histogram, sets the pixels as a candidate pixel group, searching the set candidate pixel group for recognition points through a recognition marker, recognizes three recognition points as the QR code when the three recognition points are recognized, reads out the information in the recognized QR code, and processes the read-out information in the QR code as one of display, transmission, and storage.

Furthermore, if a QR code is not recognized because three recognition points are not recognized in the candidate pixel group through the recognition marker, the QR code recognition unit 120 enlarges the surrounding image including the QR code, obtained by the photographing unit 110, in a vector way, corrects the enlarged surrounding image, converts the enlarged and corrected surrounding image including the QR code into a grayscale image of a pixel unit, converts the grayscale image into a histogram indicative of a distribution map according to the luminosity of each pixel, extracts only pixels each having a luminosity value concentration level corresponding to a threshold or higher based on the histogram, sets the extracted pixels as a candidate pixel group, searches the set candidate pixel group for recognition points through the recognition marker, and recognizes the recognition points as the QR code when the three recognition points are recognized.

The display unit 140 displays an image of a recognized QR code or displays information in the read-out QR code.

The memory unit 150 matches an image of a recognized QR code with information in the read-out QR code and stores the matched image and information.

The communication unit 160 is used to externally send an image of a recognized QR code and information in the readput QR code, and the control unit 130 externally sends an image of a QR code captured in response to a user's selection and the read-out information of the QR code through the communication unit 160 so that the image of the recognized QR code and the read-out information of the QR code are registered with social network service.

Figure 5:
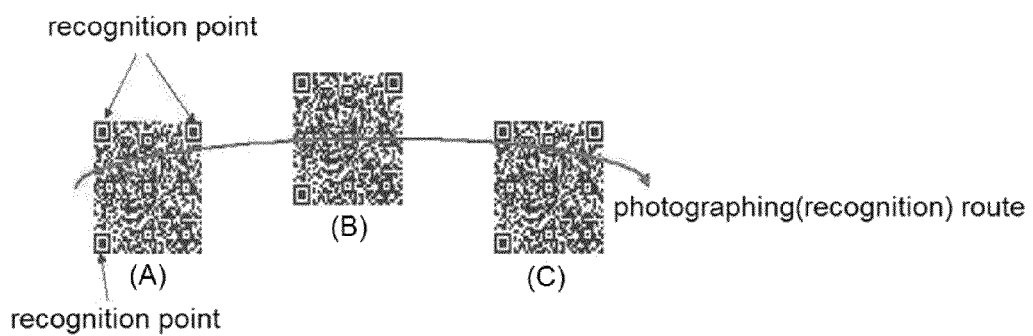
FIG. 5 is a diagram showing a process of recognizing two or more QR codes in accordance with an embodiment of the present invention.

Furthermore, if the number of QR codes is two or more, the photographing unit 110 sequentially photographs the two or more QR codes in response to a hand motion of a user as shown in FIG. 5. The QR code recognition unit 120 converts a surrounding image including a QR code, first obtained by the photographing unit 110, into a grayscale image of a pixel unit, converts the grayscale image into a histogram indicative of a distribution map according to the luminosity of each pixel, extracts only pixels each having a luminosity value concentration level corresponding to a threshold or higher based on the histogram, sets the extracted pixels as a candidate pixel group, searches the set candidate pixel group for three recognition points through a recognition marker, recognizes the retrieved three recognition points as a QR code when the three recognition points are recognized, and reads out the information in the recognized QR code. Next, the QR code recognition unit 120 converts a surrounding image including a QR code, second obtained by the photographing unit 110, into a grayscale image of a pixel unit, converts the grayscale image into a histogram indicative of a distribution map according to the luminosity of each pixel, extracts only pixels each having a luminosity value concentration level corresponding to a threshold or higher based on the histogram, sets the extracted pixels as a candidate pixel group, searches the set candidate pixel group for three recognition points through a recognition marker, recognizes the retrieved three recognition points as a QR code when the three recognition points are recognized, and reads out the information in the recognized QR code. Next, the QR code recognition unit 120 converts a surrounding image including a QR code, finally obtained by the photographing unit 110, into a grayscale image of a pixel unit, converts the grayscale image into a histogram indicative of a distribution map according to the luminosity of each pixel, extracts only pixels each having a luminosity value concentration level corresponding to a threshold or higher based on the histogram, sets the extracted pixels as a candidate pixel group, searches the set candidate pixel group for three recognition points through a recognition marker, recognizes the retrieved three recognition points as a QR code when the three recognition points are recognized, reads out the information in the recognized QR code, and displays pieces of the read-out information in the QR codes on a screen in the form of a list.

Furthermore, the selection unit 170 is used to select one of the QR codes of a QR code list displayed on a screen, and the QR code recognition unit 120 can provide information in the selected QR code on a screen in detail when one of the QR codes of the QR code list is selected.

Furthermore, the luminous intensity detection unit 180 detects luminous intensity in the periphery of a QR code, and the flash unit 190 lights a flash in response to the luminous intensity detected by the luminous intensity detection unit 180. That is, if surrounding luminosity is dark based on the surrounding luminous intensity detected by the luminous intensity detection unit 180, the flash unit 190 lights the flash, and the QR code recognition unit 120 corrects the backlight of an image of a QR code captured by the photographing unit 110 and recognizes recognition points.

Figure 2:
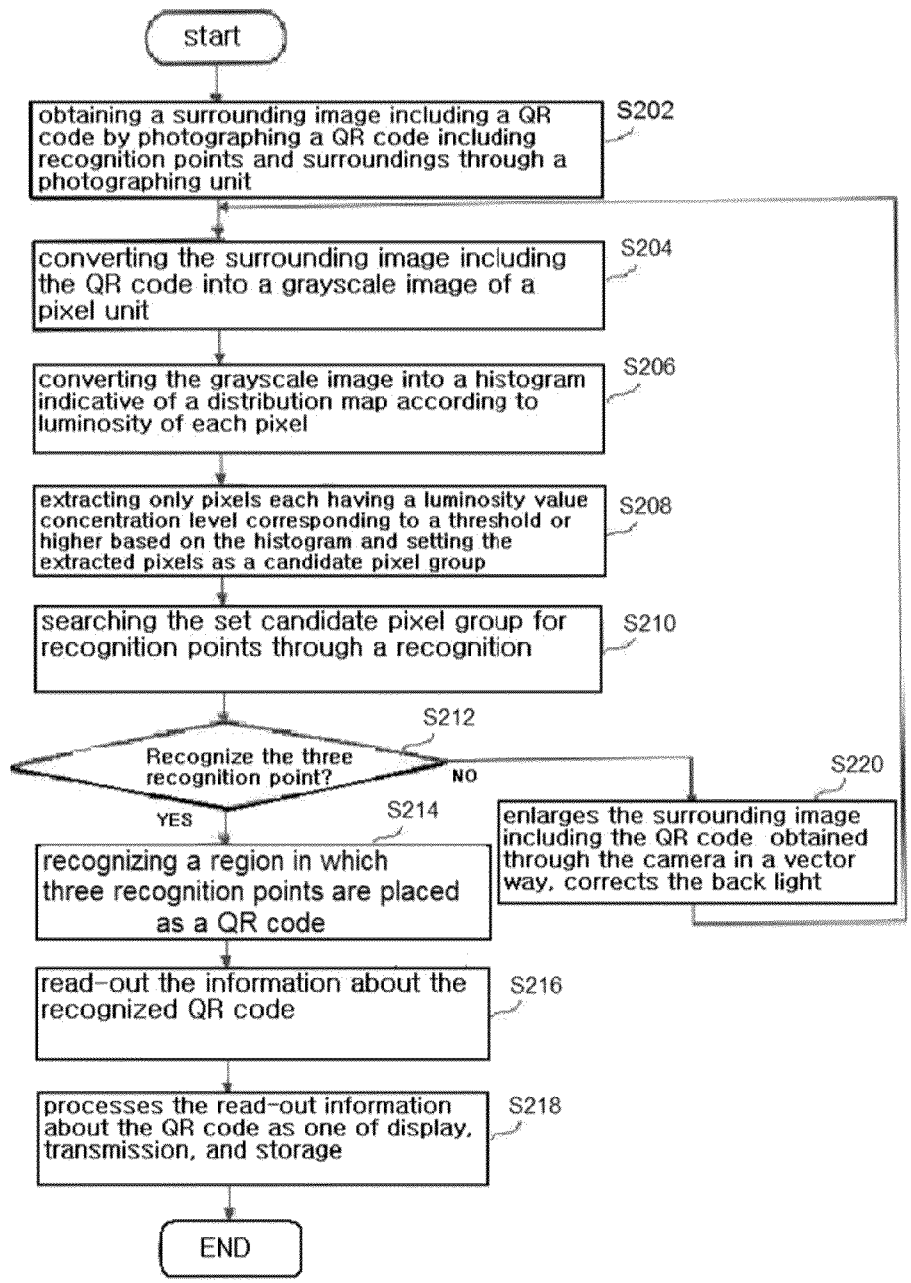
FIG. 2 is an operating flowchart illustrating a method of automatically recognizing, by the apparatus, a QR code in accordance with an embodiment of the present invention.

FIG. 2 is an operating flowchart illustrating a method of automatically recognizing a QR code in accordance with an embodiment of the present invention.

Figure 3:
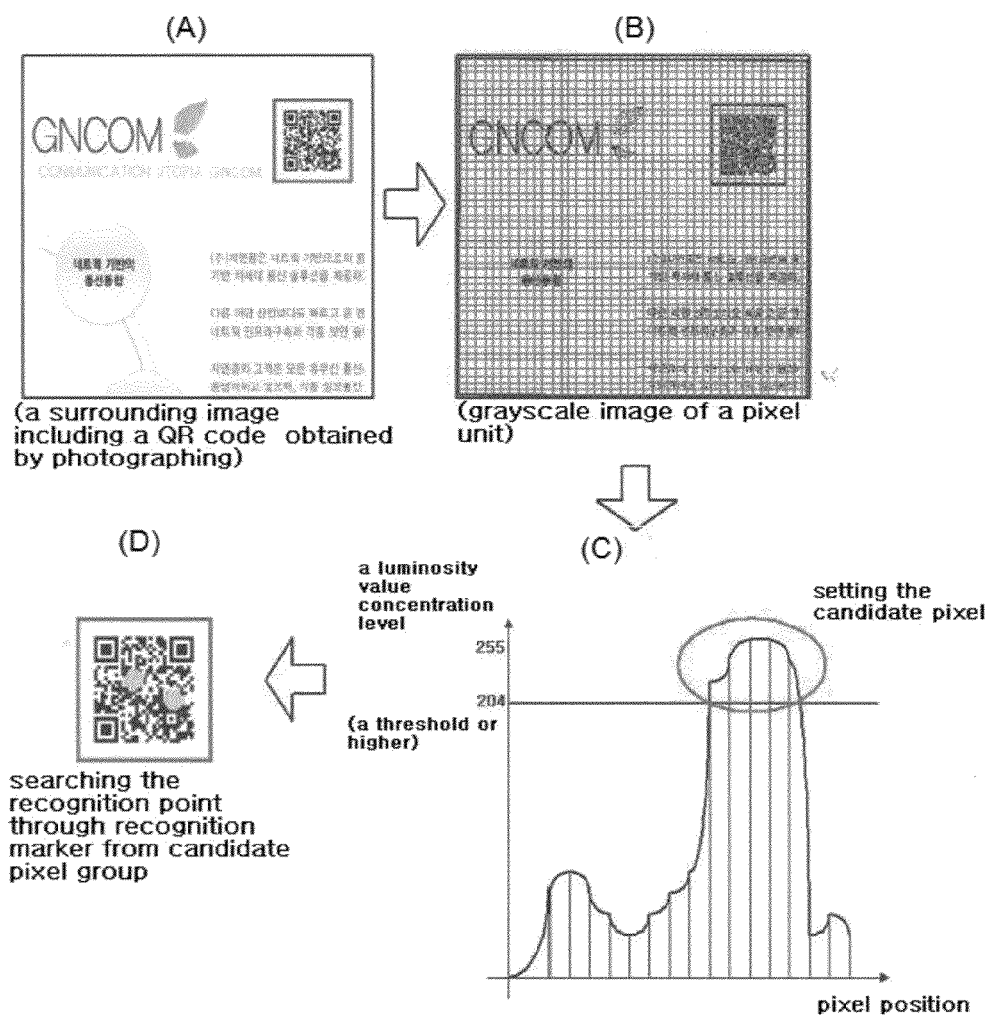
FIG. 3 is a diagram showing a QR code automatic-recognition process performed by the QR code automatic-recognition apparatus in accordance with an embodiment of the present invention.

Referring to FIG. 2, first, the QR code automatic-recognition apparatus 100 in accordance with an embodiment of the present invention obtains a surrounding image including a QR code, spaced apart from the photographing unit 110 at a distance of, for example, 50 cm or 1 m, and the surroundings of the QR code through the photographing unit 110 by photographing the QR code when a user executes a QR code recognition application as shown in FIG. 3(A) (S202). Here, the QR code includes three recognition points. FIG. 3 is a diagram showing a QR code automatic-recognition process performed by the QR code automatic-recognition apparatus in accordance with an embodiment of the present invention.

Next, the QR code automatic-recognition apparatus 100 converts the surrounding image including the photographed and obtained QR code into a grayscale image of a pixel unit through the QR code recognition unit 120 as shown in FIG. 3(B) (S204). Here, the grayscale is a scale indicative of the degree of luminosity by dividing the surrounding image step by step from white to black. That is, the QR code recognition unit 120 converts the surrounding image, including the QR code, into a black image having a luminosity value of a grayscale 0 to 255.

Next, the QR code automatic-recognition apparatus 100 converts the surrounding image including the QR code into a histogram indicative of a distribution map according to the luminosity of each pixel through the QR code recognition unit 120 as shown in FIG. 3(C) (S206). Here, the histogram indicates a ratio of the number of pixels or a total number of pixels having a level of each concentration in the level of the concentration in relation to the image. The QR code recognition unit 120 indicates concentration levels according to luminosity values of respective pixels through the histogram indicative the luminosity values in respective pixel positions as shown in FIG. 3(C). Here, in the concentration level according to the luminosity value, white is 0 (zero), black is 255, and numerous concentration levels (1~254) are present between white (0) and black (255).

Next, the QR code automatic-recognition apparatus 100 extracts only pixels, each having a luminosity value concentration level corresponding to a threshold or higher, through the QR code recognition unit 120 based on the histogram and sets the extracted pixels as a candidate pixel group as shown in FIG. 3(C) (S208). That is, since the QR code part has the highest concentration level in the grayscale image of the surrounding image including the QR code, a concentration level of 204 that corresponds to, for example, 80% of the highest luminosity value concentration level 255 of the grayscale is set as the threshold value, as shown in FIG. 3(C). And, the QR code recognition unit 120 extracts only the pixels that respectively have a concentration level of 204 or higher, and sets the extracted pixels as the candidate pixel group.

Here, the threshold is not limited to the concentration level 204 that corresponds to 80% of the highest luminosity value concentration level 255, but may be set to a higher concentration level of 230 which corresponds to 90% of the highest luminosity value concentration level 255, or other concentration levels.

Next, the QR code automatic-recognition apparatus 100 searches the set candidate pixel group for recognition points indicative of the QR code through the recognition marker using the QR code recognition unit 120 as shown in FIG. 3(D) (S210).

That is, the QR code recognition unit 120 performs a process of searching for and recognizing recognition points indicative of a QR code by contacting the pixels of the candidate pixel group having the 204 concentration level or higher, for example, based on pixels having a high concentration level through a yellow lighting or green lighting recognition marker as shown in FIG. 3(D).

Next, when recognizing three recognition points by searching the candidate pixel group for the three recognition points through the recognition marker (S212—Yes), the QR code automatic-recognition apparatus 100 recognizes a region in which the three recognition points are placed as a QR code (S214).

Next, the QR code automatic-recognition apparatus 100 reads out the information stored in the QR code through the QR code recognition unit 120 (S216).

Next, the QR code automatic-recognition apparatus 100 processes one of display, transmission, and storage of the information in the QR code that has been read out by the QR code recognition unit 120 (S218).

Meanwhile, if a QR code region is not searched for because three recognition points are not searched for through the recognition marker until a specific time elapses using the QR code recognition unit 120 at step S212 (S212—No), the QR code automatic-recognition apparatus 100 enlarges the surrounding image including the QR code obtained by the photographing unit 110 in a vector way, corrects the backlight of the enlarged surrounding image (S220), and performs steps S204 to S214 again.

Here, the vector method is a method of implementing an image made up of lines and curves that have been defined by a mathematical object. A vector image may have a clear image irrespective of resolution because the size of the vector image is automatically controlled in any resolution unlike a bitmap image. Since the capacity of a file is determined by the number of dots and lines, a vector file has a capacity much smaller than a bitmap file having the same size in a simple image. That is, the vector method is a method of storing an image using a Bezier curve unlike a bitmap method of storing information based on each dot. The Bezier curve refers to the curvature of a curve (i.e., the degree of bending) that connects points according to a mathematical method. Although an image is enlarged or reduced, a curve form of the image remains sharp and the capacity of a file is not changed due to such a changeable line.

Figure 6:
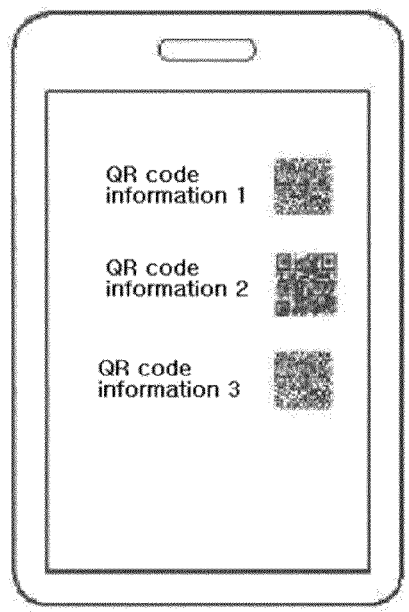
FIG. 6 is a diagram showing an example in which information stored in a plurality of QR codes recognized by one photographing is provided in the form of a list in accordance with an embodiment of the present invention.

Next, the QR code automatic-recognition apparatus 100 recognizes a QR code by searching for three recognition points through the QR code recognition unit 120, reads out the information in the QR code (S216), and displays the read-out information in the QR code on a screen. If the number of QR codes is many, the QR code automatic-recognition apparatus 100 displays pieces of the read-out information in the QR codes on a screen in the form of a list as shown in FIG. 6. If a user selects one of the pieces of information in the QR codes from the list, the QR code automatic-recognition apparatus 100 can provide detailed the read-out information for information in the selected QR code corresponding to the list.

Figure 4:
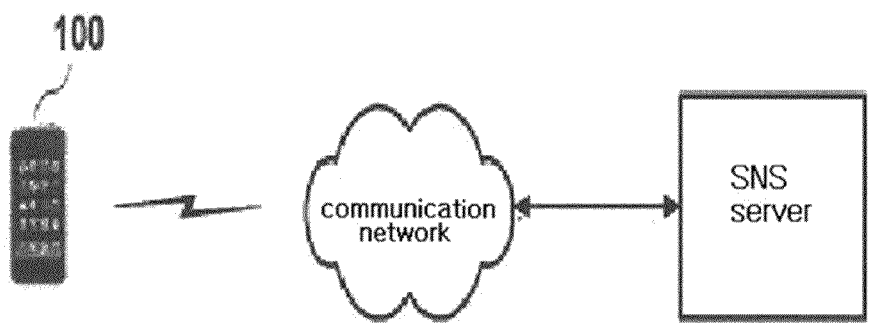
FIG. 4 is a diagram schematically showing the general composition of a system for registering an image of a captured and recognized QR code with social network service in accordance with an embodiment of the present invention.

Meanwhile, as shown in FIG. 3, the QR code automatic-recognition apparatus 100 may send an image of a recognized QR code and the read-out information in the QR code to the outside over a communication network and register the image and the read-out information with a social network service server so that the image and the read-out information can be shared with other persons within the social network service. FIG. 4 is a diagram schematically showing the general composition of a system for registering an image of a captured and recognized QR code with social network service in accordance with an embodiment of the present invention.

Furthermore, if the number of QR codes is two or more as shown in FIG. 5, the QR code automatic-recognition apparatus 100 in accordance with an embodiment of the present invention sequentially photographs the two or more QR codes in response to a user's motion as in FIGS. 5(A), 5(B), and 5(C). FIG. 5 is a diagram showing a process of recognizing two or more QR codes in accordance with an embodiment of the present invention. Here, the QR code automatic-recognition apparatus 100 first performs steps S204 to S216 on an image of the QR code (A) that is first captured, performs step S202 and performs steps S204 to S216 on an image of a next QR code (B) obtained by photographing the QR code (B), and performs step S202 and performs steps S204 to S216 on an image of the last QR code (C) obtained by photographing the QR code (C) in the same process.

Next, the QR code automatic-recognition apparatus 100 recognizes the two or more QR codes photographed by sequentially performing the steps as in FIGS. 5(A), 5(B), and 5(C), reads out the information in each of the two or more QR codes, and provides pieces of the QR code read-out information on a screen in the form of a read-out information list including the QR code images as shown in FIG. 6. FIG. 6 is a diagram showing an example in which information in a plurality of QR codes recognized by one photographing is provided in the form of a list in accordance with an embodiment of the present invention. Accordingly, a user can select one or all of the pieces of QR code information and check the selected QR code information.

Figure 7:
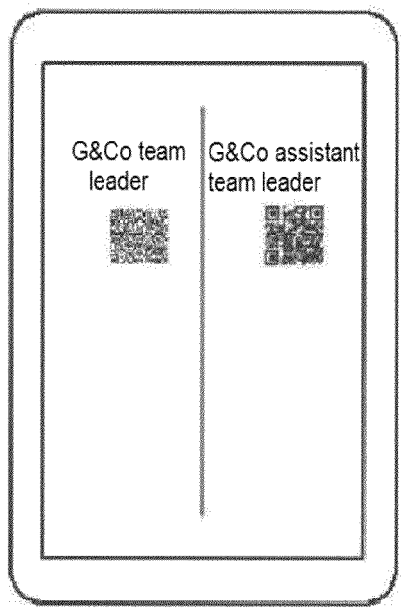
FIG. 7 is a diagram showing an example in which a screen for obtaining QR code by photographing is divided into two screens on the basis of the center line and the QR codes on the respective screens are recognized in accordance with an embodiment of the present invention.

Furthermore, the QR code automatic-recognition apparatus 100 in accordance with an embodiment of the present invention may divide a screen from which QR codes will be photographed into two on the basis of a vertical straight line at the center of the screen as shown in FIG. 7, obtain an image of the QR code (A) on the left screen and an image of the QR code (B) on the right screen on the basis of the vertical straight line at the center of the screen when photographing the two or more QR codes shown in FIG. 5 through steps S202 to S216, and provide pieces of the read-out information in the QR codes in the form of a list as shown in FIG. 6. FIG. 7 is a diagram showing an example in which a screen for obtaining QR code by photographing is divided into two screens on the basis of the center line and the QR codes on the respective screens are recognized in accordance with an embodiment of the present invention.

Meanwhile, if surrounding luminous intensity of a QR code is detected, but surrounding luminosity is dark, for example, when a QR code is recognized at night, the QR code automatic-recognition apparatus 100 in accordance with an embodiment of the present invention lights a flash through the flash unit 190, photographs the QR code, and corrects the backlight of an image of the photographed QR code. If steps S204 to S212 have been performed, but a QR code has not been recognized, the QR code automatic-recognition apparatus 100 enlarges an image of a QR code in a vector way, recognizes three recognition points in the enlarged image, and recognizes the recognized three recognition points as a QR code. Accordingly, although a surrounding environment is dark enough to recognize a QR code, the QR code can be recognized and read more clearly as compared with an existing method.

Meanwhile, a program for executing the QR code automatic-recognition method in accordance with an embodiment of the present invention may be recorded on a computer-readable medium, such as a CD or a USB medium.

As described above, the present invention can realize the apparatus and method for automatically recognizing a QR code, which can automatically recognize and read one QR code or two or more QR codes through one photographing without a need to control the distance for recognition in relation to the one QR code or two or more QR codes when a QR code recognition application that is installed in a mobile terminal carried by a user is executed.

As described above, those skilled in the art to which the present invention pertains will appreciate that the present invention may be implemented in other detailed forms without departing from the technical spirit or essential characteristics of the present invention. Accordingly, the aforementioned embodiments should be constructed as being only illustrative from all aspects not as being restrictive. The scope of the present invention is defined by the following claims rather than the detailed description, and the meanings and scope of the claims and all changes or modified forms derived from their equivalents should be constructed as falling within the scope of the present invention.

INDUSTRIAL APPLICABILITY

The present invention can be applied to a mobile terminal, such as a smart phone in which an application for scanning a QR code has been installed, and a device for scanning a QR code and providing information stored in the QR code.

DESCRIPTION OF REFERENCE NUMERALS

100: QR code automatic-recognition apparatus
110: photographing unit
120: QR code recognition unit
130: control unit 140: display unit
150: memory unit
160: communication unit
170: selection unit
180: luminous intensity detection unit
190: flash unit

The invention claimed is:

1. An apparatus for automatically recognizing a QR code, comprising:
   a photographing unit capturing images of a QR code including recognition points and surroundings of the QR code, and obtaining a surrounding image including the QR code;
   a QR code recognition unit converting the surrounding image including the QR code obtained by the photographing unit into a grayscale image of a pixel unit, converting the grayscale image into a histogram indicative of a distribution map according to luminosity of each pixel, extracting only pixels having a luminosity value concentration level the same as or higher than a threshold based on the histogram, setting extracted pixels as a candidate pixel group, searching the set candidate pixel for recognition points through a recognition marker, recognizing a region in which the recognition points are places as a QR code if the recognition points are conceived in the candidate pixel group, and reading out information stored in the recognized QR code;
   a display unit for displaying an image of the recognized QR code or displaying the read-out information in the QR code; and
   a memory unit for matching the image of the recognized QR code with the read-out information in the QR code and storing the matched image and the read-out information,
   wherein, if three recognition points are not recognized in the candidate pixel group through the recognition marker and thus a QR code is not recognized, the QR code recognition unit enlarges the surrounding image including the QR code obtained through the photographing unit in a vector way, corrects the enlarged surrounding image, converts the enlarged and corrected surrounding image including the QR code into a grayscale image of a pixel unit, converts the grayscale image into a histogram representing a distribution map according to luminosity of each pixel, extracts only pixels each having a luminosity value concentration level the same as or higher than a threshold based on the histogram, sets the extracted pixels as a candidate pixel group, searches the set candidate pixel group for three recognition points through the recognition marker, and, if the three recognition points are conceived, recognizes a region in which the three recognition points are placed as a QR code.

2. The apparatus of claim 1, further comprising:
   a communication unit externally sending an image of the recognized QR code and the read-out information in the QR code; and
   a control unit controlling the image of the recognized QR code and the read-put information in the QR code so that the image and read-out information are displayed or stored, sending the image of the recognized QR code and the read-out information in the QR code through the communication unit and controlling the image of the recognized QR code and the read-out information in the QR code so that the image and the read-out information are registered with external social network service.

3. The apparatus of claim 1, wherein, if two or more QR codes are photographed through the photographing unit, the QR code recognition unit
   converts a surrounding image including a QR code, first obtained by the photographing unit, into a grayscale image of a pixel unit, converts the grayscale image into a histogram indicative of a distribution map according to luminosity of each pixel, extracts only pixels each having a luminosity value concentration level corresponding to a threshold or higher based on the histogram, sets the extracted pixels as a candidate pixel group, searches the set candidate pixel group for three recognition points through a recognition marker, if the three recognition points are conceived, recognizes a region in which the three conceived recognition points are placed as a QR code, and reads out the information in the recognized QR code,
   converts a surrounding image including a QR code, second obtained by the photographing unit, into a grayscale image of a pixel unit, converts the grayscale image into a histogram indicative of a distribution map according to luminosity of each pixel, extracts only pixels each having a luminosity value concentration level corresponding to a threshold or higher based on the histogram, sets the extracted pixels as a candidate pixel group, searches the set candidate pixel group for three recognition points through a recognition marker, if the three recognition points are conceived, recognizes a region in which the three conceived recognition points are placed as a QR code, and reads out the information in the recognized QR code, and
   converts a surrounding image including a QR code, finally obtained by the photographing unit, into a grayscale image of a pixel unit, converts the grayscale image into a histogram indicative of a distribution map according to luminosity of each pixel, extracts only pixels each having a luminosity value concentration level corresponding to a threshold or higher based on the histogram, sets the extracted pixels as a candidate pixel group, searches the set candidate pixel group for three recognition points through a recognition marker, if the three recognition points are conceived, recognizes a region in which the three conceived recognition points are placed as a QR code, reads out the information in the recognized QR code, and displays pieces of the read-out information in the QR codes on a screen in a list form.

4. The apparatus of claim 1, further comprising:
   a luminous intensity detection unit detecting luminous intensity in a periphery of the QR code; and
   a flash unit lighting a flash in response to the detected luminous intensity of the luminous intensity detection unit,
   wherein if surrounding luminosity is dark based on the surrounding luminous intensity detected by the luminous intensity detection unit, the flash unit lights the flash and the QR code recognition unit corrects a backlight of an image of the QR code captured by the photographing unit.

5. An application providing apparatus for a user terminal for providing a program stored on a non-transitory computer readable medium for a user terminal over a communication network, wherein the program obtains a surrounding image including a QR code by photographing the QR code including recognition points and surroundings through a camera, converts the obtained surrounding image including the QR code into a grayscale image of a pixel unit, converts the grayscale image into a histogram indicative of a distribution map according to luminosity of each pixel, extracts only pixels each having a luminosity value concentration level corresponding to a threshold or higher based on the histogram, sets the extracted pixels as a candidate pixel group, searches the set candidate pixel group for recognition points through the recognition marker, if three recognition points are conceived, recognizes a region in which the conceived three recognition points are placed as a QR code, enlarges the surrounding image including the QR code obtained through the camera in a vector way if three recognition points are not recognized in the candidate pixel group through the recognition marker and thus a QR code is not recognized, corrects the enlarged surrounding image, converts the enlarged and corrected surrounding image including the QR code into a grayscale image of a pixel unit, converts the grayscale image into a histogram indicative of a distribution map according to luminosity of each pixel, extracts only pixels each having a luminosity value concentration level corresponding to a threshold or higher based on the histogram, sets the extracted pixels as a candidate pixel group, searches the set candidate pixel group for three recognition points through the recognition marker, if the three recognition points are conceived, recognizes a region in which the three recognition points are placed as a QR code, and reads out the information in the recognized QR code.

6. A method for automatically recognizing a QR code, comprising steps of:
 (a) obtaining a surrounding image including a QR code by photographing a QR code including recognition points and surroundings through a photographing unit;
 (b) converting the surrounding image including the QR code, obtained through the photographing unit, into a grayscale image of a pixel unit;
 (c) converting the grayscale image into a histogram indicative of a distribution map according to luminosity of each pixel;
 (d) extracting only pixels each having a luminosity value concentration level the same as or higher than a threshold based on the histogram and setting the extracted pixels as a candidate pixel group;
 (e) searching the set candidate pixel group for recognition points through a recognition marker;
 (f) when three recognition points are conceived in the set candidate pixel group, recognizing a region in which the conceived three recognition points are placed as a QR code; and
 (g) reading out information stored in the recognized QR code,
 wherein, if three recognition points are not recognized in the candidate pixel group through the recognition marker and thus a QR code is not recognized at the step (f), the surrounding image including the QR code obtained through the photographing unit is enlarged, the enlarged surrounding image is corrected, and the steps (b) to (g) are performed on the enlarged and corrected surrounding image including the QR code.

7. The method of claim 6, further comprising a step (h) of externally sending an image of the recognized QR code and the read-out information in the QR code, sending the image and the read-out information to social network service, and registering the image and the read-out information with the social network service.

8. A computer-readable medium in which a program for executing a method for automatically recognizing a QR code according to claim 7 is recorded.

9. The method of claim 6, wherein if two or more QR codes are photographed at the step (a), the steps (b) to (g) are performed on a surrounding image including a QR code that is first obtained through the photographing unit, the steps (b) to (g) are performed on a surrounding image including a QR code that is second obtained through the photographing unit, and the steps (b) to (g) are performed on a surrounding image including a QR code that is finally obtained in an identical process through the photographing unit.

10. The method of claim 9, further comprising steps of:
 (h) displaying pieces of the read-out information in the QR codes on a screen in a list form;
 (i) selecting one QR code from the list of pieces of information in the QR codes; and
 (j) providing the read-out information for information in the QR code corresponding to the selected list.

11. A computer-readable medium in which a program for executing a method for automatically recognizing a QR code according to claim 1 is recorded.

12. A computer-readable medium in which a program for executing a method for automatically recognizing a QR code according to claim 9 is recorded.

13. The method of claim 6, wherein the step (a) comprises lighting a flash if luminous intensity in a periphery of the QR code is detected and surrounding luminosity is dark, obtaining a surrounding image including the QR code by photographing the QR code and surroundings, and correcting a backlight of the obtained surrounding image including the QR code.

14. A computer-readable medium in which a program for executing a method for automatically recognizing a QR code according to claim 13 is recorded.

15. A non-transitory computer readable medium in which a program for executing a method for automatically recognizing a QR code according to claim 6 is recorded.

* * * * *